United States Patent [19]

Stein

[11] 4,444,196
[45] Apr. 24, 1984

[54] DIGITAL INTRAVENOUS SUBTRACTION ANGIOGRAPHY

[75] Inventor: Jay A. Stein, Bedford, Mass.

[73] Assignee: Diagnostic Technology, Inc., Bedford, Mass.

[21] Appl. No.: 390,256

[22] Filed: Jun. 21, 1982

[51] Int. Cl.³ .......................... A61B 6/00; H04N 5/32
[52] U.S. Cl. ..................................... 128/654; 358/111
[58] Field of Search .......................... 128/653; 378/99; 358/111

[56] References Cited

U.S. PATENT DOCUMENTS 4,335,427  6/1982  Hunt et al. ...................... 358/111 X
4,393,402  7/1983  Keyes et al. ........................ 358/111

OTHER PUBLICATIONS

Kruger, R. A., "A Digital Video Image Processor for Real-Time X-Ray Subtraction Imaging", *Optical Engrg.*, vol. 17, #6, Nov.–Dec. 1978, pp. 652–657.

Mistretta, C. A. et al., "Computerized Fluoroscopy Techniques for Non-Invasive Cardiovascular Imaging", Proc. Soc. of Photo-Opt. Engrs., San Diego, Aug. 28–29, 1979, pp. 5–71.

Frost, M. M. et al., "A Digital Video Acquisition System for Extraction of Subvisual Info. in Diagnostic Medical Imaging", Conf.-Proc. of the Soc. of Photo-Optical Engrs., vol. 177, Boston, MA, 25–27, Sep. 1977, pp. 209–215.

*Primary Examiner*—Kyle L. Howell
*Assistant Examiner*—Francis J. Jaworski
*Attorney, Agent, or Firm*—Lawrence S. Levinson; Sanford J. Asman

[57] ABSTRACT

In a digital intravenous subtraction angiography system an X-ray generator provides low mA continuous X-ray exposures illuminating a standard image intensifier producing an image scanned by a conventional television camera to provide a video signal. An analog-to-digital converter converts the video signal into digital form. The digital frame signals are added together in real time to provide an intermediate digital signal representing the addition of typically 5 to 20 frames. A digital disk receives and stores the intermediate image signals. A subsequent intermediate image signal is added to a second memory while a previously formed intermediate image signal is transferred from a first memory to disk storage. The first and second memories are operated in "ping pong" fashion so that each and every video frame signal during the acquisition period, typically 15 seconds, is summed to form one of the intermediate images. A selected mask image signal is subtracted from any or all intermediate image signals to provide an enhanced subtracted image signal. Various mask image signals may be subtracted so that the operator may decide by visual inspection of the subtracted image signals which mask image signal minimizes misregistration artifacts. Each intermediate image signal or each subtraction intermediate image signal is weighted approximately proportional to the contrast agent intensity to form a weighted sum signal. The operator may exclude from this combining process any intermediate signal which the operator has determined is not suitably registered. An intermediate image signal may be processed to provide a phantom image signal through translation and/or rotation of the intermediate image signal.

17 Claims, 1 Drawing Figure

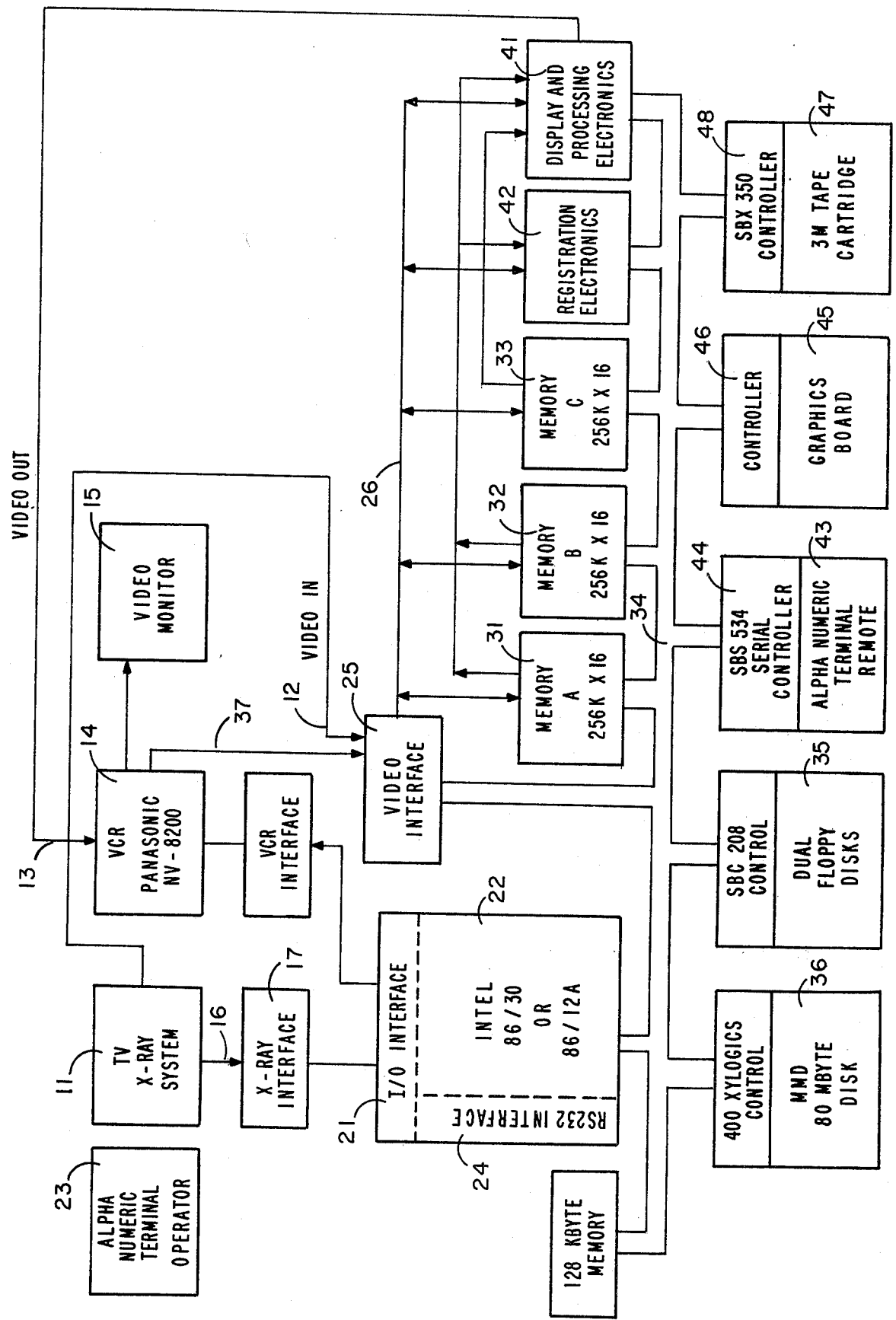

DIGITAL INTRAVENOUS SUBTRACTION ANGIOGRAPHY

The present invention relates in general to digital intravenous subtraction angiography (DISA) and more particularly concerns novel apparatus and techniques for providing high resolution angiograms with relatively inexpensive additional equipment that coacts with existing standard medical X-ray equipment with relatively little modification, even if an associated image intensifier and television imaging chain is characterized by high noise levels. A DISA system typically provides an angiogram of arteries in a patient using a relatively low concentration of radiopaque contrast agent by subtracting an image obtained prior to the arrival of the contrast agent in the artery of interest from an image obtained during the presence of contrast agent to remove the background in the image and enhance the contrast between the image of the opacified artery and the background. An intravenous injection of contrast material which is relatively safe for the patient produces adequate contrast. Conventional angiography involves injecting contrast material through a catheter inserted into the artery of interest in a procedure that places the patient in considerably more danger and discomfort than with the relatively safe intravenous injection.

One prior art approach comprises a system described in U.S. Pat. Nos. 4,204,225 and 4,204,226. In one form of the prior art an image intensifier receives a sequence of X-ray pulses a few times per second to produce a video signal that is digitized. A typical pulsing sequence is two pulses per second for twenty seconds with each pulse produced by 200 to 1000 ma of X-ray tube current for 10 to 100 milliseconds. In some pulse systems a small number of video frames are integrated (typically two or four) if the pulse duration exceeds thirty milliseconds (one video frame). Other pulsed systems use a pulsed progressive technique in which the television readout is suspended during the duration of the pulse, and the entire signal is integrated on the face of the television camera tube. After the pulse ends, a single video frame is read out.

Pulsed DISA systems are often difficult to interface with existing medical X-ray equipment for two reasons. First, an X-ray generator must be available which is capable of providing the required relatively high intensity X-ray pulses, and electronic interfacing equipment is required for synchronizing the pulsing of the generator with the DISA system. Second, many television cameras used with existing medical X-ray equipment have signal-to-noise ratios too low to provide a satisfactory video signal. It is thus often necessary to replace the existing television camera with a costlier camera having an adequate signal-to-noise ratio, typically 1000:1.

A pulsed system obtains an image by subtracting a mask image, obtained from an exposure to X-rays before contrast agent enters the artery of interest, from a data image, obtained when the contrast opacification is approximately maximum. Frequently, the mask image and the data image may be poorly registered if the patient has moved between the time the two images were obtained (typically about 5 seconds). In the prior art as practiced with pulsed systems, it is possible to choose a different mask image which might be better registered with the selected data image after all the data has been collected in accordance with known remasking techniques.

Another type of prior art system is the recursive filter system described in an article entitled "Time Domain Filtering Using Computerized Fluoroscopy—Intravenous Angiography Applications" by Robert Kruger et al. in SPIE Vol. 314 of the paper presented at the Conference on Digital Radiography of the Society of Photo-Optical Instrumentation Engineers in 1981. While this system overcomes a number of the disadvantages of the pulsed system in that it operates with low mA X-ray generators, works with television cameras having relatively low signal-to-noise ratios, can use single phase X-ray generators and does not require complex interfaces for pulse synchronization, the prior art recursive filter system used a method of averaging video frames that does not lend itself to performing remasking conveniently.

It is an important object of the invention to provide an improved DISA system. In particular, it is an object of this invention to combine the ability to perform remasking as practiced with pulsed DISA systems with the ability to perform signal averaging (to allow low mA operation) as practiced in the recursive filter system.

According to the invention, a typical medical X-ray generator provides low mA continuous X-ray exposures illuminating a standard image intensifier producing an image scanned by a conventional television camera to produce a video signal. Analog-to-digital converting means converts the video signal into digital form in real time, and adding means add the digital frame signals together in real time to provide an intermediate digital signal representing the addition of typically 5 to 20 frames although more frames may be added, typically as many as 128. Digital storage means, such as a digital disk, receive and store the intermediate image signals. Preferably, there are first and second memory means, such as in the system memory, with means for summing a subsequent intermediate image in the second memory means while a previously formed intermediate image is being transferred from first memory means to disk storage means. The two memory means may be regarded as operated in "ping pong" fashion so that each and every video frame during the acquisition period, typically 15 seconds, is summed to form one of the intermediate images. An intermediate image obtained by summing 20 video frames obtained at a typical X-ray mA setting of 10 mA represents the same number of detected X-ray photons as an image obtained from a single video frame obtained with an X-ray mA setting of 200 mA. By adding video frames together, the signal-to-noise requirement of the television camera and the X-ray mA requirements are both relaxed. For example, if 16 television frames are averaged together, the noise in the television camera will average out and will be 4 times smaller than the noise in a single television frame. Also the mA required to achieve the same X-ray statistical noise level will be 16 times smaller when 16 video frames are averaged as compared to measuring a single video frame.

According to another feature of the invention, means are provided for subtracting a selected mask image signal from any (or all) intermediate image signal to provide an enhanced subtracted image signal. The mask image signal is typically one of the intermediate image signals. Means are provided to subtract various mask image signals so that the operator may decide by visual inspection of the subtracted image signals which mask image signal minimizes misregistration artifacts.

According to another feature of the invention means are provided to display many subtracted image signals simultaneously. Typically a television display may contain 16 minified images displayed in a 4×4 array. The display of many subtracted image signals facilitates the selection of a mask image signal which minimizes misregistration artifacts in intermediate subtraction image signals which contain contrast agent.

According to another feature of the invention means are provided for weighting each intermediate image signal or each subtraction intermediate image signal approximately proportional to the contrast agent intensity therein to form a weighted sum signal. The sum signal further reduces the noise in the final image signal. According to the process of the invention, the operator may exclude from this combining process any intermediate image signal which the operator has determined is not suitably registered even after an optimum mask has been selected whereby only intermediate image signals free from severe misregistration artifacts are used to form the weighted sum signal. Intermediate image signals which are well registered to the same mask image signal (i.e. which do not form misregistration artifacts upon subtraction) are registered well to each other.

According to another feature of the invention means are provided for processing an intermediate image signal to provide a phantom image signal which is even better registered to an optimum mask. To this end there is means for translating and/or rotating the intermediate image signal to produce a phantom signal. If a number of intermediate image signals are thus rotated/translated such that each is better registered to a fixed mask, then the intermediate image signals will be better registered to each other and the combined image signal will be improved.

Numerous other features, objects and advantages will become apparent from the following specification when read in connection with the accompanying drawing the single FIGURE of which is a block diagram illustrating the logical arrangement of a system according to the invention.

With reference to the drawing there is shown a block diagram illustrating the logical arrangement of a system according to the invention. An X-ray system 11 provides an input video signal on line 12 representative of a shadowgraph of a patient before and after intravenous injection of an X-ray-opaque material. The input video signal is processed to provide on video output line 13 a video output signal that may be recorded on video cassette recorder (VCR) 14 and displayed on video monitor 15 representative of an angiogram showing a blood system portion of interest, such as an artery, with high resolution to facilitate detecting abnormalities.

As is evident from the prior art identified above specific techniques for combining and processing the signals described herein are known in the art and details of combining them will be avoided to avoid obscuring the principles of the invention.

X-ray system 11 provides a signal through X-ray interface 17 to I/O interface 21 for signaling to microcomputer 22 information that a sequence of video signals is being provided on line 12. Microcomputer 22 also interfaces with an alphanumeric terminal 23 operated by an operator through interface 24 to provide information on desired signal processing as described below.

The input video signal on line 12 is delivered to video interface 25. Video interface 25 typically comprises a 9-bit analog-to-digital converter and a 12-bit programmable look-up table operating at 12 megahertz for obtaining image matrices of sizes up to 512×512 pixels. Digitized data signals may be exchanged on bus 26 with any of memory A 31, memory B 32 and memory C 33. These memories are essentially identical, typically 256K×16 memories. The digitized video data signals provided by video interface 25 may be added to the contents of any of the memories in either a direct accumulation mode or in an exponentially weighted accumulation mode. Microprocessor controller 22 determines every 1/60 second, the field period, which memories accumulate the next video field, which will transfer their contents over the high speed bus 26, and which will transfer their contents over computer bus 34, typically to hard disk 36 for storage. Floppy disk 35 is typically used to store computer programs.

Video interface 25 includes provision for providing signals representative of matrix sizes of 256×256 and 128×128 pixels in addition to 512×512 pixels. When these reduced matrices are used, preferably adjacent points in the basic 512×512 array are added together to realize an improvement in noise reduction associated with a corresponding reduction in matrix size.

Video interface 25 preferably includes a phase-locked-loop circuit which locks with the video sync pulses provided on line 12 by X-ray system 11 or on line 37 by video cassette recorder 14. The gain and offset values of the video amplifier in video interface 25 may be controlled by microcomputer 22 providing signals over computer bus 34 to accommodate variations among television cameras in the field. Microcomputer 22 may provide signals to video interface 25 controlling which of lines 12 and 37 will have data signals digitized. The techniques for accomplishing these functions are well-known in the art.

Display and processing electronics 41 processes the digital data signals to provide an analog video data output signal that may be recorded on video cassette recorder 14 and displayed on video monitor 15. It may perform addition, subtraction, multiplication and other functions in a known manner, preferably at high rates on data signals transferred over high speed bus 26. Display and processing electronics 41 implement a conventional real-time mask mode display during data acquisition, a cine-mode display achieved using real-time interpolation between signals stored in image memories 31–33, a matched filter algorithm for combining image signals after data acquisition, and other high speed computational and display functions.

Registration electronics 42 may perform sub-pixel image translation, rotation and zoom, using techniques known in the art, for example, generally of the type used in digital graphics display systems. Registration electronics 42 may coact with display and processing electronics 41 to allow automatic image registration over selected regions of the image to be implemented to effect a best match between mask and data frames.

Automatic image registration may be accomplished in the following manner. An intermediate image matrix signal is processed by an appropriate multiplier matrix signal to provide a repositioned intermediate image signal translated and/or rotated to a new coordinate system slightly different from the original intermediate image matrix signal. For example, one of the new series of images might correspond to the translation of the image signal ½ pixel to the right, another might correspond to the rotation of image signal by one degree and a third might correspond to translation of the image signal by ½ pixel and rotation by one degree. A typical series of new images might consist of all combinations of the following translations and rotations.

Translation right and left in 10 equal steps (each of magnitude equal to 0.2 pixels) ranging from one pixel to the left to one pixel to the right.

Translations up and down in 10 equal steps ranging from one pixel down to one pixel up. Rotation clockwise and counterclockwise in 10 equal 1° steps ranging from −5° to +5°.

Each of these 1000 repositioned image matrix signals may be rapidly determined from the original image matrix signal by linear interpolation between the nearest four points. Each of these 1000 repositioned image matrix signals may then be subtracted from a mask image matrix signal, and the sum of the square of the differences over a select region of the data image signal of most interest to diagnosing the patient may be provided. The repositioned image matrix signal which minimizes the sum of the square of the differences is identified as the one in best registration with the mask image matrix signal in this region and provides the difference signal displayed and/or recorded for diagnosis.

The system may also include a remote alphanumeric terminal 43 with associated controller 44, a graphics board 45 and associated controller 46 for annotating image display and a tape cartridge system 47 and associated controller 48 that may be used for archival storage of patient images, typically storing 512×512 pixels each represented by an 8-bit word.

Having described the system arrangement, its mode of operation will be described. The system may be operated in the recursive filter mode embodying largely the technique described in the aforesaid Kruger et al. paper. The incoming video signal on line 12 is digitized to a 512×512 matrix with two differently weighted accumulations stored continuously in two of memories 31–33. Each pixel is updated according to the recursion formula:

$$Y(j)=kY(j-1)+(1-k)Z(j-1)$$

where Y(j) is the memory content of a pixel at television frame number j and Z(j) is the new value of the pixel at the same frame number. In this formula k is given by: $k=(1-\frac{1}{2}^{**}n)$ where n = 0,1,2 ... 7. The stored signals in the two memories are differentially combined field-after-field to provide a corresponding sequence of difference video signals in digital form that are converted into analog form and continuously displayed on video monitor 15 and recorded on VCR 14. The difference digital signal may also be stored on a disk 35, typically at a rate of three frames per second. The real-time 30 frame/sec. subtraction or differnce image signal may be used for operator convenience with hard copy images typically being obtained by cycling through the images stored on the disk 35. A disadvantage of this recursive filter mode operation is that the technique involves using an average mask image and an average data image with the averaging function approximating an exponential weighting in time to provide a mask image which always contains contrast provided by the injected contrast medium, such as iodine, resulting in considerable loss in signal-to-noise ratio, corresponding to approximately a factor of two wasted X-ray flux.

A preferred form of operation of the system is the matched filter mode which weights image signals by a factor approximately proportional to the amount of contrast agent then in the vessel then exposed to provide the image signal to optimize the signal-to-noise ratio of the resulting sum. The operator may also manually exclude from the weighted sum those image signals which have severe misregistration artifacts by appropriately designating the undesired signals with the alphanumeric terminal 23. This mode also allows use of registration electronics 42 to further reduce effects of misregistration.

In this mode of operation the video signal on line 12 is digitized, converted to logarithmic form and accumulated in memory in either a 256×256 or 512×512 pixel format. The memory accumulates the frames with uniform weight and hard disk 36 stores digital signals representative of these accumulated frames as intermediate image signals. Two of memories 31-33 may be used in ping-pong fashion with memory A 31 accumulating frame signals while memory B 32 transfers to disk memory 35 and vice versa. For 512×512 operation, intermediate image signals are typically integrated over 20 video frames (0.67 sec). For 256×256 operation images are typically integrated over 5 video frames (0.17 sec).

For a typical X-ray system operating with an exposure rate to the image intensifier of about 10-20 microroentgen/frame, an exposure period corresponding to 5 to 20 video frames is consistent with detecting sufficient X-ray flux to achieve a high quality image (50-400 microroentgen). The shorter integration period is preferred for clinical situations, such as renal artery imaging, where arterial motion might be a factor. The longer integration periods are preferred for imaging more stationary vessels, such as the carotids.

During data acquisition the third memory C 33 may be used to store a mask image signal, which may be either a selected intermediate image signal or an exponentially weighted moving mask average signal, such as used in the recursive filter mode. Intermediate image signals are differentially combined with the mask signal, converted into analog form to provide the video output signal on line 13 and displayed continuously in real time on video monitor 15 for operator convenience. The procedure may be terminated early if the operator sees that the contrast bolus has passed by entering an appropriate command through alphanumeric terminal 23.

After data signal acquisition, the operator may review all of the intermediate images using a 16-image (4×4) minified image display format on video monitor 15 established in a manner well-known in the art by storing the digital representations of these images in the output register of display and processing electronics that is converted into analog form and provided on line 13. The intermediate images are typically first viewed using a preselected mask image. From these 16 subtraction images the operator selects the one with maximum contrast agent. This maximum opacification image may then be displayed using each of the other images as a mask so that the operator can select a more optimum mask. The original 16 subtraction images may then be displayed using the optimum mask, and the operator may designate for removal from further processing those intermediate images which give rise to severe misregistration artifacts through alphanumeric terminal 23.

In some cases the intermediate image signal with maximum contrast agent, properly masked, will contain sufficient diagnostic information to obviate the need for further processing. However, all of the intermediate image signals which have not been rejected by the operator may be automatically combined with the weighting factors, such as those corresponding to the use of a matched filter, to provide a resulting combined image signal having an improved signal-to-noise ratio and will generally be of superior quality in the absence of substantial arterial pulsation. If the resulting combined displayed image is satisfactory, it may be photographed or its digital representation stored for archival purposes, such as on tape cartridge 47 or floppy disk 35. If a region of interest contains a misregistration artifact, the region may be identified through alphanumeric terminal 23 and automatic registration effected with registration electronics 42 over the selected image region. This registration improvement may be achieved by registering each of the intermediate images which has not been rejected by the operator to the optimum mask image.

The specific techniques for effecting the signal manipulation described above are known and not described in detail herein to avoid obscuring the inventive concepts.

There has been described novel apparatus and techniques for providing improved digital intravenous subtraction angiography with relatively little additional expense using X-ray television equipment already available in most hospitals. It is evident that those skilled in the art may now make numerous uses and modifications of and departures from the specific embodiments described herein without departing from the invention concepts. Consequently the invention is to be construed as embracing each and every novel feature and novel combination of features present in or possessed by the apparatus and techniques herein disclosed and limited solely by the spirit and scope of the appended claims.

What is claimed is:

1. In a method of performing digital intravenous subtraction angiography including the steps of directing penetrating radiation through a subject before and after intravenous injection of radiopaque material that significantly attenuates said radiation to obtain corresponding analog video signals that are converted into digital form that are processed to form a data signal representative of a shadowgraph with said material and a mask signal representative of substantially the same shadowgraph with significantly less of said material to provide a difference digital signal that is converted into analog form as an output video signal and displayed, the improvement comprising:
   (a) cumulatively combining a sequence of digital video signals each representative of substantially the same shadowgraph to form an intermediate image signal;
   (b) selecting at least one but less than all of said intermediate signals to form a mask signal; and
   (c) differentially combining the mask signal thus formed with at least one non-adjacent intermediate image signal having substantial maximum contrast in response to injection of said material to provide an output digital difference signal.

2. The improvement in accordance with claim 1 and further including the steps of:
   (a) converting said output digital difference signal into analog form; and
   (b) displaying the latter converted signal upon a visible monitor.

3. The improvement in accordance with claim 2 wherein said analog video signals are television video signals representative of a sequence of frames of the shadowgraph represented thereby and said sequence of digital signals is representative of a corresponding sequence of frames within the range of four to thirty.

4. The improvement in accordance with claim 1 and further including the steps of:
   (a) forming a plurality of said mask signals;
   (b) differentially combining at least two of said mask signals with one selected intermediate image signal having substantially maximum contrast to provide a corresponding plurality of subtraction signals;
   (c) observing said subtraction signals; and
   (d) utilizing the latter observation to select as an optimum mask image signal that mask image signal that minimizes misregistration artifacts when differentially combined with the selected intermediate image signal.

5. The improvement in accordance with claim 4 and further including the step of differentially combining said intermediate image signals with said optimum mask signal to provide a plurality of intermediate subtraction image signals,
   simultaneously displaying a visible representation of said intermediate subtraction image signals,
   and rejecting for further processing those intermediate image signals associated with said intermediate subtraction image signals observed as poorly registered relative to said optimum mask signal.

6. The improvement in accordance with claim 4 and further including the step of translating and rotating at least one of said intermediate image signals to more closely match said optimum mask signal and thereby provide a repositioned intermediate image signal with improved registration over at least a selected area of said shadowgraph.

7. The improvement in accordance with claim 5 and further including the steps of:
   (a) providing a weighting factor signal representative of a characteristic of a nonrejected intermediate image signal; and
   (b) combining said weighting factor signal with the associated nonrejected intermediate image signal to provide a weighted intermediate image signal.

8. The improvement in accordance with claim 7 wherein said weighting factor signal is proportional to the intensity of the contrast agent image represented by the associated intermediate image signal.

9. The improvement in accordance with claim 1 wherein said analog video signals are television video signals representative of a sequence of frames of the shadowgraph represented thereby and said sequence of digital signals is representative of a corresponding sequence of frames within the range of four to thirty.

10. In digital intravenous subtraction angiography including means for directing penetrating radiation through a subject before and after intravenous injection of radiopaque material that significantly attenuates said radiation to obtain corresponding analog video signals that are converted into digital form and processed to form both a data signal representative of a shadowgraph with said material and a mask signal representative of substantially the same shadowgraph with significantly less of said material to provide a difference digital signal, means for converting the latter digital signal into analog form as an output video signal, and means for displaying said output video signal, the improvement comprising:

(a) means for cumulatively combining a sequence of digital video signals each representative of the same shadowgraph to form an intermediate image signal;

(b) means for displaying a plurality of said intermediate signals;

(c) means for selecting at least one, but less than all of said intermediate signals, to form a mask signal; and (d) means for differentially combining the mask signal thus formed with at least one non-adjacent intermediate image signal having substantial maximum contrast in response to injection of said material to provide an output digital difference signal.

11. The improvement in accordance with claim 10 and further including:

(a) means for conterting said output digital difference into analog form; and (b) means for visibly displaying an image represented by the latter converted signal.

12. The improvement in accordance with claim 11 wherein said analog video signals are television video signals representative of a sequence of frames of the shadowgraph represented thereby and said means for visibly displaying an image is a television monitor.

13. The improvement in accordance with claim 12 and further including:

(a) means for forming a plurality of said mask signals;

(b) means for differentially combining at least two of said mask signals with one selected intermediate image signal having substantially maximum contrast to provide a corresponding plurality of subtraction signals;

(c) means for observing said subtraction signals; and (d) means for utilizing the latter observation to select as an optimum mask image signal that mask image signal that minimizes misregistration artifacts when differentially combined with the selected intermediate image signal.

14. The improvement in accordance with claim 13 and further comprising:

(a) means for providing a weighting factor signal representative of a characteristic of a nonrejected intermediate image signal; and (b) means for combining said weighting factor signal with the associated nonrejected intermediate image signal to provide a weighted intermediate image signal.

15. The improvement in accordance with claim 14 wherein said means for providing a weighting factor signal provides a weighting factor signal proportional to the intensity of the contrast agent image represented by the associated intermediate image signal.

16. In a method of performing digital intravenous subtraction angiography including the steps of directing penetrating radiation through a subject before and after intravenous injection of radiopaque material that significantly attenuates said radiation to obtain corresponding analog video signals that are converted into digital form that are processed to form a data signal representative of a shadowgraph with said material and a mask signal representative of substantially the same shadowgraph with significantly less of said material to provide a difference digital signal that is converted into analog form as an output video signal and displayed as television video signals representative of a sequence of frames of the shadowgraph represented thereby and said sequence of digital signals is representative of a corresponding sequence of frames within the range of four to thirty, the improvement comprising:

(a) cumulatively combining a sequence of digital video signals each representative of substantially the same shadowgraph to form an intermediate image signal;

(b) selecting at least one but less than all of said intermediate signals to form a mask signal;

(c) differentially combining the mask signal thus formed with the intermediate image signal having substantial maximum contrast in response to injection of said material to provide an output digital difference signal;

(d) converting said output digital difference signal into analog form; and (e) displaying the latter converted signal upon a visible monitor;

(f) forming a plurality of said mask signals;

(g) differentially combining at least two of said mask signals with one selected intermediate image signal having substantially maximum contrast to provide a corresponding plurality of subtraction signals;

(h) observing said subtraction signals;

(i) utilizing the latter observation to select as an optimum mask image signal that mask image signal that minimizes misregistration artifacts when differentially combined with the selected intermediate image signal;

(j) differentially combining said intermediate image signals with said optimum mask signal to provide a plurality of intermediate subtraction image signals;

(k) simultaneously displaying a visible representation of said intermediate subtraction image signals; and (l) rejecting for further processing those intermediate image signals associated with said intermediate subtraction image signals observed as poorly registered relative to said optimum mask signal.

17. In a method of performing digital intravenous subtraction angiography including the steps of directing penetrating radiation through a subject before and after intravenous injection of radiopaque material that significantly attenuates said radiation to obtain corresponding analog video signals that are converted into digital form that are processed to form a data signal representative of a shadowgraph with said material and a mask signal representative of substantially the same shadowgraph with significantly less of said material to provide a difference digital signal that is converted into analog form as an output video signal and displayed as television video signals representative of a sequence of frames of the shadowgraph represented thereby and said sequence of digital signals is representative of a corresponding sequence of frames within the range of four to thirty, the improvement comprising:

(a) cumulatively combining a sequence of digital video signals each representative of substantially the same shadowgraph to form an intermediate image signal;

(b) selecting at least one but less than all of said intermediate signals to form a mask signal;

(c) differentially combining the mask signal thus formed with the intermediate image signal having substantial maximum contrast in response to injection of said material to provide an output digital difference signal;

(d) converting said output digital difference signal into analog form; and (e) displaying the latter converted signal upon a visible monitor;
(f) forming a plurality of said mask signals;
(g) differentially combining at least two of said mask signals with one selected intermediate image signal having substantially maximum contrast to provide a corresponding plurality of subtraction signals;
(h) observing said subtraction signals;
(i) utilizing the latter observation to select as an optimum mask image signal that mask image signal that minimizes misregistration artifacts when differentially combined with the selected intermediate image signal; and
(j) translating and rotating at least one of said intermediate image signals to more closely match said optimum mask signal and thereby provide a repositioned intermediate image signal with improved registration over at least a selected area of said shadowgraph.

* * * * *